Dec. 13, 1949  T. CARROLL  2,491,248
V BELT TRANSMISSION
Filed Sept. 24, 1945  2 Sheets-Sheet 1

INVENTOR.
THOMAS CARROLL
BY  A.S.Krob
ATTORNEY

Patented Dec. 13, 1949

2,491,248

UNITED STATES PATENT OFFICE 2,491,248

V-BELT TRANSMISSION

Thomas Carroll, Toronto, Ontario, Canada, assignor to Massey-Harris Co. Ltd., Toronto, Ontario, Canada, a corporation of Canada Application September 24, 1945, Serial No. 618,223

4 Claims. (Cl. 74—230.17)

The present invention relates to what may be termed a spring loaded variable speed V-belt transmission which is provided with a lever and a foot pedal so the transmission is handled somewhat similar to the transmission control on an automobile.

The principal object of my invention, generally stated, is to provide a transmission which is simple, light, easily manufactured at low cost and a transmission which is particularly applicable for use on power driven combines.

An object of my invention is to provide a V-belt transmission which will give a considerable range in speed control and being under control of a foot pedal so the transmission may be made inoperative similar to the foot pedal control of an automobile transmission, in addition to providing means whereby when the lowest speed ratio is passed, the belt will be caused to ride on an idler sleeve which is mounted on the driver shaft.

A further object of the present invention is to provide a speed ratio control lever whereby the ratio is not disturbed by the operation of the foot pedal.

Another object of the present invention is to provide a transmission which can be operated by remote control, through relatively light connecting rods, so that when the operator is a considerable distance from the transmission it will operate easily and whereby anyone capable of driving a car can drive a self-propelled combine.

To these and other useful ends my invention consists of parts, combinations of parts or their equivalents and mode of operation as hereinafter described and claimed and shown in the accompanying drawings in which:

Figure 1:
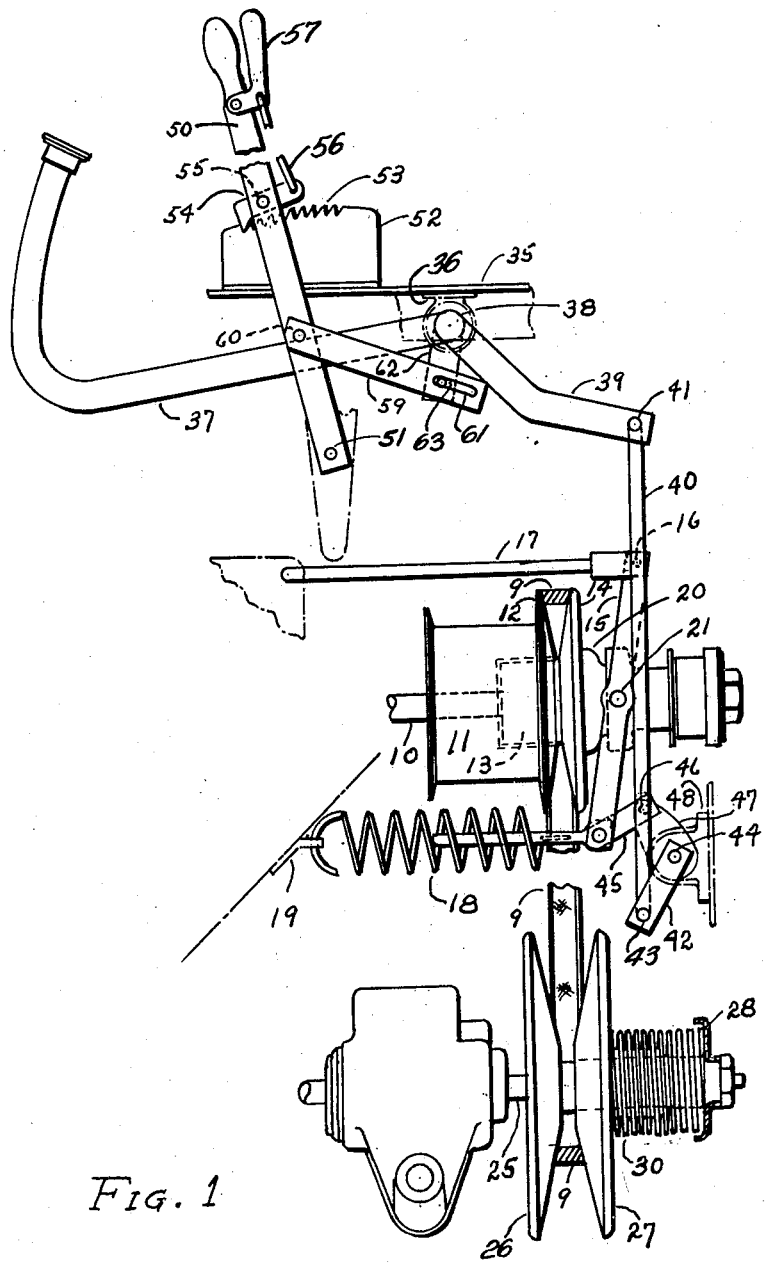
Fig. 1 is a plan view of my invention illustrating the transmission set at a high speed ratio.

As thus illustrated the V-belt is designated by reference numeral 9. A driver shaft 10 is shown as having a flat belt pulley 11 adapted to furnish power through a suitable belt, for a grain tank unloader. I secure one side of a V-belt pulley 12 either to the belt pulley 11 or shaft 10. I provide an idling sleeve 13 on shaft 10, this sleeve being similar to member 26 in Patent #2,336,002, December 7, 1943, C. E. Everett.

The other side of this V-belt pulley is designated by reference numeral 14 and being slidably keyed to shaft 10 and having a lever 15 which at one end is pivoted as at 16 to an anchoring link 17. The other end of this lever has an operating connection to a pull spring 18 which is anchored to some part of the device as at 19. Lever 15 is shaped intermediate its ends to straddle hub 20 of member 14, and being rotatably connected to this hub through two pins 21 which are pivoted to sectors which fit freely in a groove in member 20 (not shown); thus spring 18 will act to urge member 14 toward member 12.

I provide a driven shaft 25 having keyed thereto one side of a V-belt pulley 26, the other side of this V-belt pulley 27 is slidably keyed on the hub of member 26. I mount a washer 28 on shaft 25 and hold this washer in position by means of a nut 29. I provide a spring 30 between members 27 and 28 which is adapted to urge member 27 toward member 26. Thus it will be seen that I have provided a spring loaded V-belt transmission, the springs being adapted to exert pressure against the sides of the V-belt.

In order to make my device operative spring 18 is considerably stronger than spring 30 so that the springs cooperate when not otherwise influenced to move the belt toward its highest speed position as illustrated in Figure 1.

As illustrated member 26 is fixed to shaft 25 and member 27 is slidably keyed on the hub of member 26 or to shaft 25. Clearly if found desirable member 27 may be secured to shaft 25 and member 26 slidably keyed to the shaft having suitable connections whereby spring 30 will urge this member toward member 27. In the later event the free end of the spring will be on the right side and its connection (preferably a number of bolts) from this free end to member 26 will urge this member toward member 27; in either event nut 29 will act to hold the assembly together.

I will now describe the manually operated controlling means for my transmission. On the floorboard 35 or some other similar part near the operator's seat I mount my speed controlling means as follows: I secure a bracket 36 to member 35 to which a foot pedal 37 is pivoted as at 38. Member 37 is secured to an arm 39 which at its free end is pivoted to a link 40 as at 41. Link 40 is pivoted to the free end of an arm 42 as at 43; this arm being rotatably mounted on a bracket 48 as at 44, bracket 48 being secured to some stationary part of the device.

It will be noted that arm 15 at its lower end is hingedly connected to a link 45, the other end of this link being hingedly connected as at 46 to a lever 47, which is either secured directly to member 42 or to shaft 44. Thus it will be seen that by pressing on the free end of foot pedal 37, the pull of spring 18 will be overcome and member 14 will be moved away from belt 9, so as to make the transmission inoperative and when the foot pedal is released the transmission will again operate.

Figure 2:
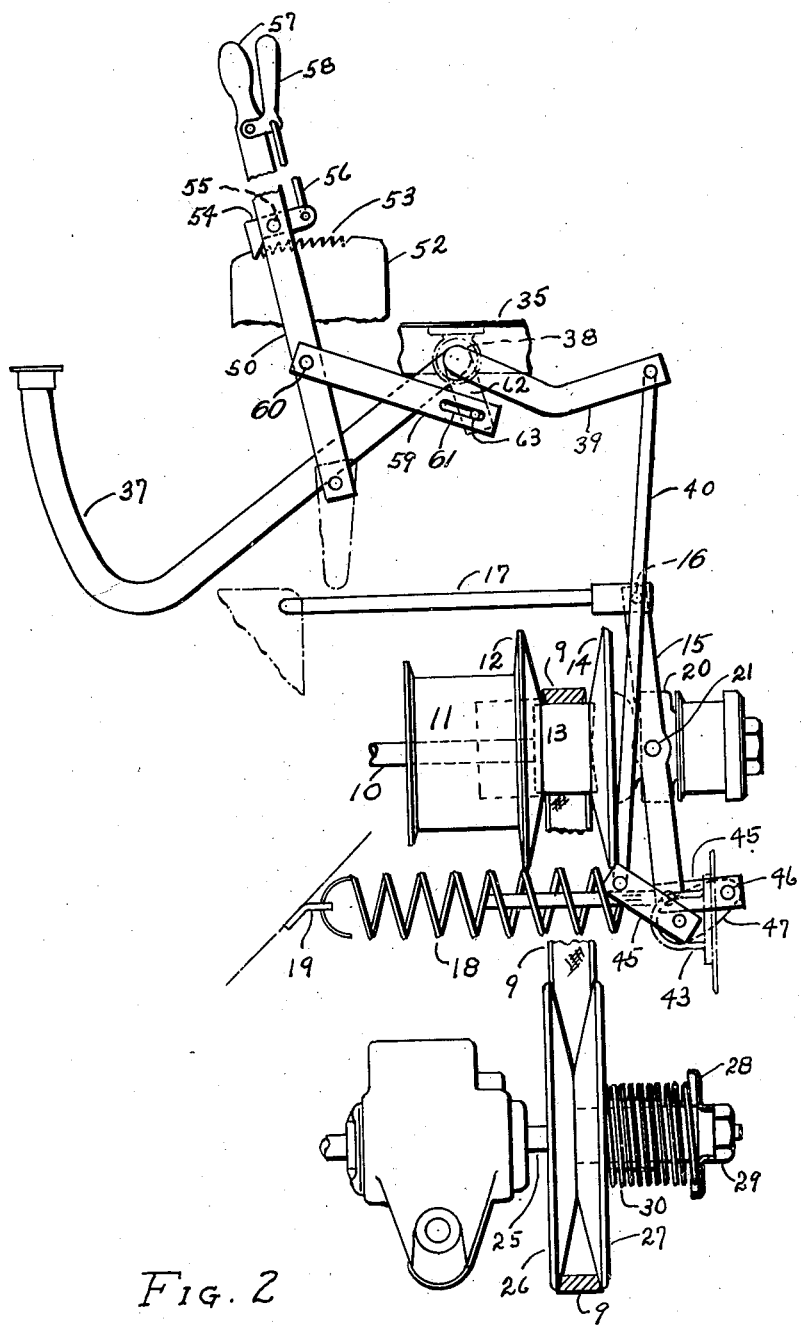
Fig. 2 is a plan view of my transmission positioned for idling or the belt positioned just past lowest speed ratio.

If pedal 37 is held for a time in its lowest position, belt 9 being freed between members 12 and 14 will be caused to travel outwardly between members 26 and 27 until finally the belt assumes the position shown in Figure 2.

I provide a speed selecting means as follows: It will be understood that the pull of spring 18 will exert a greater pressure on the belt between members 12 and 14 than the pressure on the belt between members 26 and 27; therefore the tendency will be for the belt to travel toward high speed ratio.

I provide a speed controlling lever 50 which is pivoted at its lower end as at 51 preferably to some part anchored to member 35. A sector 52 is preferably anchored to member 35 having a series of closely spaced saw teeth notches 53. Lever 50 is provided with a dog 54 which is pivotally connected to the lever as at 55, one end of member 54 having a projection adapted to engage one of the notches 53 (as shown). The other end of this dog has a connection to link 56 which at its upper end is connected to a hand piece 57 positioned near the top of the lever and pivoted thereto. Lever 50 is hingedly connected to a link 59 as at 60, the other end of link 59 having a slot 61. An arm 62 at its upper end is secured to member 39 thus forming a bell crank. On the lower end of member 62 I provide a bolt 63 which slidably extends through slot 61.

Thus it will be seen that the position of lever 50 will determine the position at which foot pedal 37 will come to rest in its upward movement thereby determining the speed ratio of the transmission, foot pedal 37 merely acting similar to the clutch pedal of an automobile to throw the transmission out of engagement and lever 50 acting to determine the speed ratio assumed by the transmission when pedal 37 is released.

It will be seen that my dual control is far superior to a spring loaded V-belt transmission wherein a lever is used to shift the pulley sides for determining the speed ratio. My control is quite similar to an automobile transmission control; namely, a lever is used to determine the speed ratio and a foot pedal is used for throwing the clutch out of gear, and when the clutch pedal is released the transmission will be engaged.

Attention is called to the fact that when the clutch pedal is pressed down far enough the transmission will be disengaged regardless of the position of the belt or lever 50. However since spring 18 exerts a greater pressure on the sides of the belt than spring 30, the tendency of the belt will be to travel toward the highest speed permitted by the position of lever 50. If the foot pedal is held down long enough, clearly, since contact with the belt between members 12 and 14 has been eliminated by the action of the foot pedal, the belt will travel automatically to the position shown in Figure 2, and come to rest on free sleeve 13. When pressure on the foot pedal is released, spring 18 being heavier then spring 30 will cause the belt to travel toward its high speed position or the position shown in Figure 1.

This travel may however be stopped by the position of lever 50 when bolt 63 comes in contact with the end of slot 61. The speed ratio will then remain permanent and the transmission continue to operate until pedal 37 is again pressed down. It will be noted that generally the transmission will start to operate at low speed and then the speed will be increased until lever 50 acts to prevent any further change.

Having thus shown and described my invention I claim:

1. In a transmission of the character described comprising; a driver and a driven V-belt pulley, each pulley on one side being slidably splined to the driver and driven elements and each pulley having a spring adapted to urge the sides of the pulleys together, the driver pulley spring being heavier than the driven pulley spring, whereby the belt will tend to travel toward its highest speed ratio, manually operated means adapted to overcome the pressure of the driver pulley spring, whereby the speed ratio may be determined, said manually operated means including a foot pedal and a lever associated therewith having means whereby the highest speed position of the belt will be determined by the position of the lever and the foot pedal may act to control all speed ratios permitted by the position of the lever, a rotatably mounted sleeve positioned under and between said driver pulley sides whereby when said foot pedal is moved far enough the belt will be caused to ride freely on the sleeve.

2. In a transmission of the character described comprising; a driver and a driven V-belt pulley, each pulley on one side being slidably splined to its other side and each pulley having a spring adapted to urge the sides of the pulleys together, the driver pulley spring being heavier than the driven pulley spring, whereby the belt will tend to travel toward its highest speed ratio, manually operated means adapted to overcome the pressure of the driver pulley spring, whereby the speed ratio may be determined, said manually operated means including a foot pedal and a lever associated together by means whereby the highest speed position of the belt will be determined by the position of the lever and the foot pedal may act to control the engaging and disengaging of the belt.

3. A V-belt transmission of the character described comprising, a driver and a driven V-belt pulley and a V-belt forming an operating connection therebetween, one side of each pulley being splined mounted for end movement, each splined mounted side having a spring adapted to urge engagement with the belt, the spring associated with the driver pulley being more powerful than the other spring, a manually controlled foot pedal having an operating connection with the slidable side of the driver pulley and being adapted to overcome the spring pressure thereof and permit the other spring to urge the belt toward the periphery of the driven pulley, a manually controlled lever associated with said foot pedal adapted to optionally limit the releasing movement of the pedal, whereby said clutch pedal may be used for disengaging the belt and the lever used for determining the operating speed ratio between the driver and driven pulleys.

4. A V-belt transmission of the character described comprising, a driver and a driven V-belt pulley and a V-belt forming an operating connection therebetween, one side of each pulley being splined mounted for end movement, each splined mounted side having a spring adapted to urge engagement with the belt, the spring associated with one of said pulleys being more powerful than the other, whereby when operating the belt will be urged to travel outward on the pulley having the more powerful spring, a manually controlled foot pedal having an operating connection with the slidable side of the pulley having the more powerful spring and being adapted to overcome this spring pressure when depressed, whereby the belt will be urged to travel toward the periphery of the other pulley, a manually controlled lever associated with said foot pedal adapted to optionally limit the releasing travel of the pedal, whereby the pedal may be used for disengaging the belt and the lever used to determine operating speed ratio between the pulleys.

THOMAS CARROLL.

REFERENCES CITED

The following references are of record in the file of this patent:

UNITED STATES PATENTS

| Number | Name | Date |
|---|---|---|
| 596,281 | Spaulding | Dec. 28, 1897 |
| 1,279,547 | Hueber | Sept. 24, 1918 |
| 2,045,870 | Paton | June 30, 1936 |
| 2,168,744 | Perrine | Aug. 8, 1939 |
| 2,199,012 | Skelley | Apr. 30, 1940 |
| 2,230,575 | Meyers | Feb. 4, 1941 |

FOREIGN PATENTS

| Number | Country | Date |
|---|---|---|
| 2,441 | Great Britain | A. D. 1879 |
| 18,152 | Great Britain | A. D. 1908 |
| 435,257 | Great Britain | Sept. 18, 1935 |
| 551,872 | France | Apr. 16, 1923 |